(12) United States Patent
Vladimir

(10) Patent No.: US 6,639,883 B1
(45) Date of Patent: Oct. 28, 2003

(54) APPARATUS AND METHOD UTILIZED IN PERSONAL COMPUTER FOR CONTROL OF DISK DRIVE RATE TO REDUCE ITS NOISE AND VIBRATION

(75) Inventor: Knyazhitsky Vladimir, St.-Petersburg (RU)

(73) Assignee: Data Stream Info Inc, New York City, NY (US)

( * ) Notice: Subject to any disclaimer, the term of this patent is extended or adjusted under 35 U.S.C. 154(b) by 511 days.

(21) Appl. No.: 09/694,480

(22) Filed: Oct. 24, 2000

(51) Int. Cl.$^7$ ................................. G11B 5/09
(52) U.S. Cl. ................ 369/47.44; 369/53.18; 369/53.42
(58) Field of Search .............. 369/47.36, 47.41, 369/47.44, 47.46, 47.47, 53.12, 53.13, 53.14, 53.18, 53.42; 360/73.03, 69

(56) References Cited

U.S. PATENT DOCUMENTS

| | | | | |
|---|---|---|---|---|
| 5,764,430 A | * | 6/1998 | Ottesen et al. | 360/69 |
| 5,862,113 A | * | 1/1999 | Tsuyuguchi et al. | 369/53.18 |
| 6,088,185 A | * | 7/2000 | Ratliff et al. | 360/77.03 |
| 6,111,826 A | * | 8/2000 | Minase | 369/53.18 |
| 6,222,336 B1 | * | 4/2001 | McKenzie et al. | 369/239 |
| 6,351,440 B1 | * | 2/2002 | Fukuda et al. | 369/47.44 |
| 6,424,606 B1 | * | 7/2002 | Okazaki et al. | 369/53.18 |
| 6,493,169 B1 | * | 12/2002 | Ferris et al. | 360/73.03 |

* cited by examiner

Primary Examiner—Thang V. Tran

(57) ABSTRACT

Apparatus and method for reducing noise and vibrations in a personal computer having at least one disk data-storage device (disk drive), e.g., CDROM drive. The disk drive operation (data reading from or writing to the disk) is afforded by rotation of the disk at a steady rate that is prescribed by a command drawn from related processing block of the computer. The apparatus integrates a disk drive, control program, and data file. For a disk drive under control, the data file lists for each logical operation mode an optimum rotational rate for the drive motor, the optimal value being the lowest value of rotation rate for the drive to provide a sufficient rate of data exchange between the drive and corresponding data processor. In accordance with the optimal disk drive rotation rate value, the program generates necessary control commands to set the disk drive motor to the required rotation rate. The disk drive noise and generated vibration increase with increasing rotational rate, and thus minimizing the disk drive rotation rate for the current logical operation mode reduces the noise generated by the drive. User's interface incorporated into the system provides a means for manual control over the disk drive rotation rate, and an additional noise level sensor may be coupled to the system to provide an alternative automatic disk drive rotation rate control mode ensuring allowable level of noise generated by the disk drive under control.

3 Claims, 4 Drawing Sheets

APPARATUS AND METHOD UTILIZED IN PERSONAL COMPUTER FOR CONTROL OF DISK DRIVE RATE TO REDUCE ITS NOISE AND VIBRATION

FIELD OF THE INVENTION

The present invention relates to control of disk drives in computer-type systems.

BACKGROUND OF THE INVENTION

Essentially all types of modem computers are provided with systems of data storage (reading or/and writing information) on the base of disk drives. E. g., CD-ROM drive is the disk data storage device that has enjoyed the widest application in personal computers. Disk drives are very efficient data storage systems due to short time of hunting for written-dawn information and their high-reliability.

In all disk drives information pickup comes about through rotation of the disk containing coded information, the speed of reading being increased with the disk rotation rate. At the same time, high rotation rate is followed by objectionable acoustic vibrations and noise caused first of all by inevitable disk misbalance. E. g., it is just CD-ROM drive that proves to be, when in operation, the main source of noise and vibration in personal computer.

In contrast to, say, DC current fan motor, for which rotation rate may be modified from the outside by variation of power supplied to the motor, modern disk drive contains a built-in system (the drive controller) that controls over the disk rotation rate (see FIG. 1 and corresponding description below). E. g., in modem CD drive provided with a step motor, the drive controller generates electric pulses supplied to the motor and is able to change the pulse repetition rate determining the motor rotation rate. To change the motor rotation rate from the outside (from the PC motherboard)—to set it to motion, to stop, etc.—it is necessary to send a corresponding command to the drive controller via the PC system bus. The list of commands is specified by the drive manufacturer, and depends of the drive type. Generally, in modem PCs such commands are used to stop a disk drive or to set it to rotation at the maximal available rate specified by the drive manufacturer. Typically (e.g., for CD drives) the manufacturers give not the maximal rotating rate of the disk, but (proportional to it) maximal rate of reading/writing information from/to the disk.

It should be noted that for typical applications the speed of information reading from (writing to) disk is of no importance. E. g., for most of modem programs 12x (i.e., approximately 12×150 Kbyte/sec) CD-ROM rate would be quite sufficient, while the most commonly employed today types of the drive afford the rate of 50x.

The present invention employs simple and novel methods and apparatus for overcoming the disadvantages of high level of noise and vibration generated by CD-ROM drive (and other types of disk drives) in personal computer. The principle of the approach consists in control over the disk drive rotation rate, manual or automatic, to set it to minimal value providing a sufficient data exchange rate for the given logical operation mode.

SUMMARY OF THE INVENTION

In accordance with the principles of this invention, the noise generated by at least one disk drive in personal computer is a source of noise and vibration caused by disk rotation, the noise and vibration being a is found to be a non-decreasing function of the rotational rate of the drive motor. In order to reduce the noise, it is necessary to reduce this rotational rate. To this end, a program or/and hardware module is installed to the computer to control over the disk drive rotation rate. The module generates specific command coming to the drive micro-controller to set its rate to a certain value, the command being taken from a data file, which contains for said disk drive a table that lists for each rotation rate of the drive a command to set the drive to the rate. In manual operation regime the rotation rate value is chosen by PC user via user's interface either directly, or by specifying a logical operation mode of the drive ("laser record-player", etc.). In automatic mode, the drive rotation rate is determined algorithmically by step-wise decreasing the rate from the maximal value (assigned by the drive manufacturer) to the rate that yields an allowable noise level. In the latter mode, the apparatus incorporates additionally a noise level sensor (e.g., a microphone), and the data file also specifies a maximum allowable noise level.

DETAILED DESCRIPTION OF PREFERRED EMBODIMENTS

Figure 1:
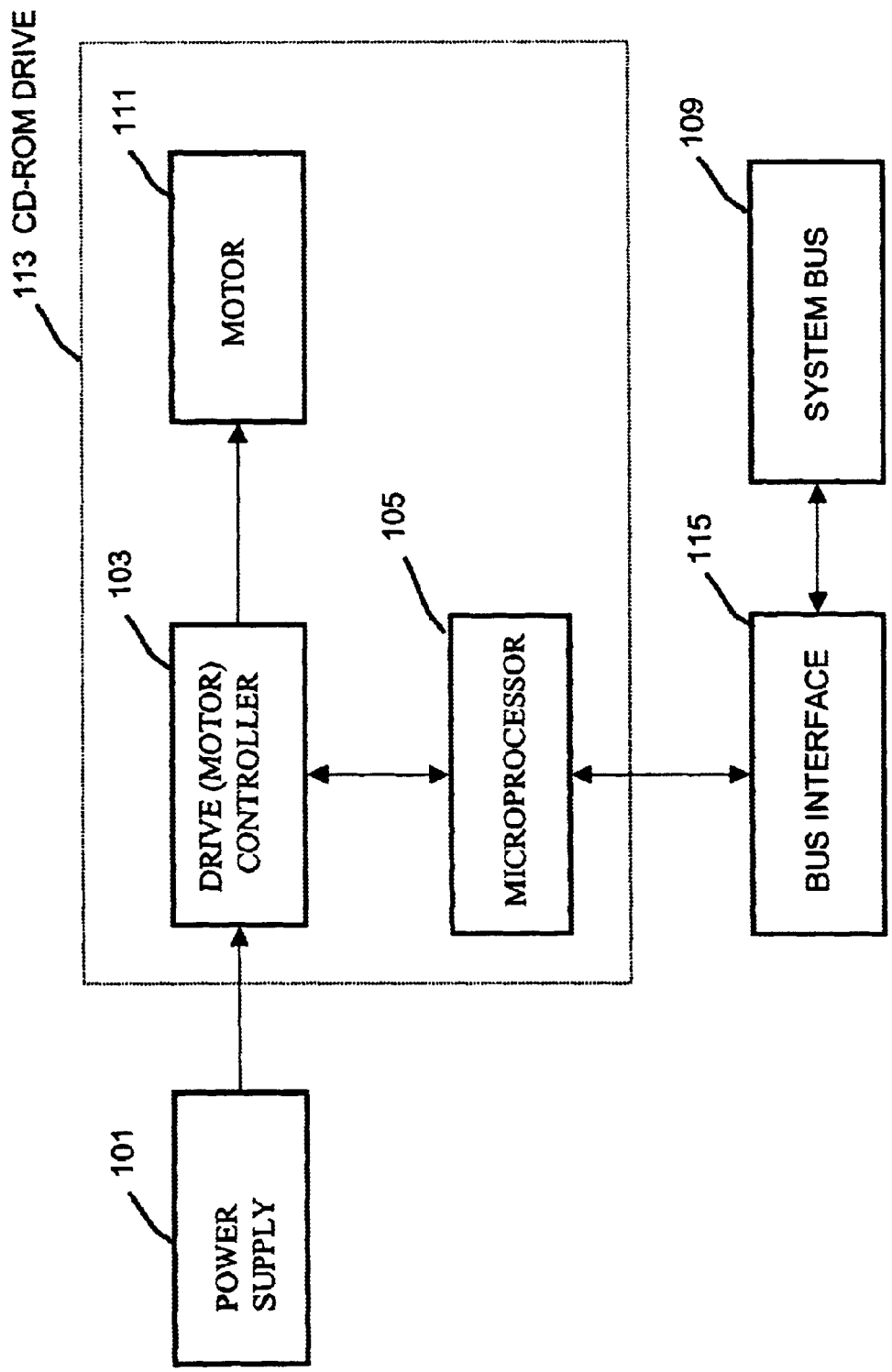
FIG. 1 depicts a flowchart of disk drive power supply and rotating rate control.

Using CD-ROM drive as an example, FIG. 1 shows a basic flowchart applied in modem computers to control over a disk drive rotation rate.

Power supply unit 101 of the computer generates voltage supplied to computer components including the CD-ROM drive. The drive is provided with controller 103, which exerts control over the drive motor (step motor) 111, the motor rate determining information reading speed afforded by the drive (for writing CD drive, the same is valid for data writing speed). The control over the motor rotating speed is performed through varying the repetition rate of voltage pulses supplied to the step motor.

Microprocessor 105 receives commands via bus interface 115 from system bus 109, specifically commands related to motor rate control. When one of the commands arrives, the microprocessor 105 programs the drive controller 103 in such a way as to set the pulse repetition rate of the voltage pulses supplied to the step motor 111 to the level prescribed by the command.

With disk drive provided with motor of a different kind, the rotation rate control system operates quite analogously.

Figure 2:
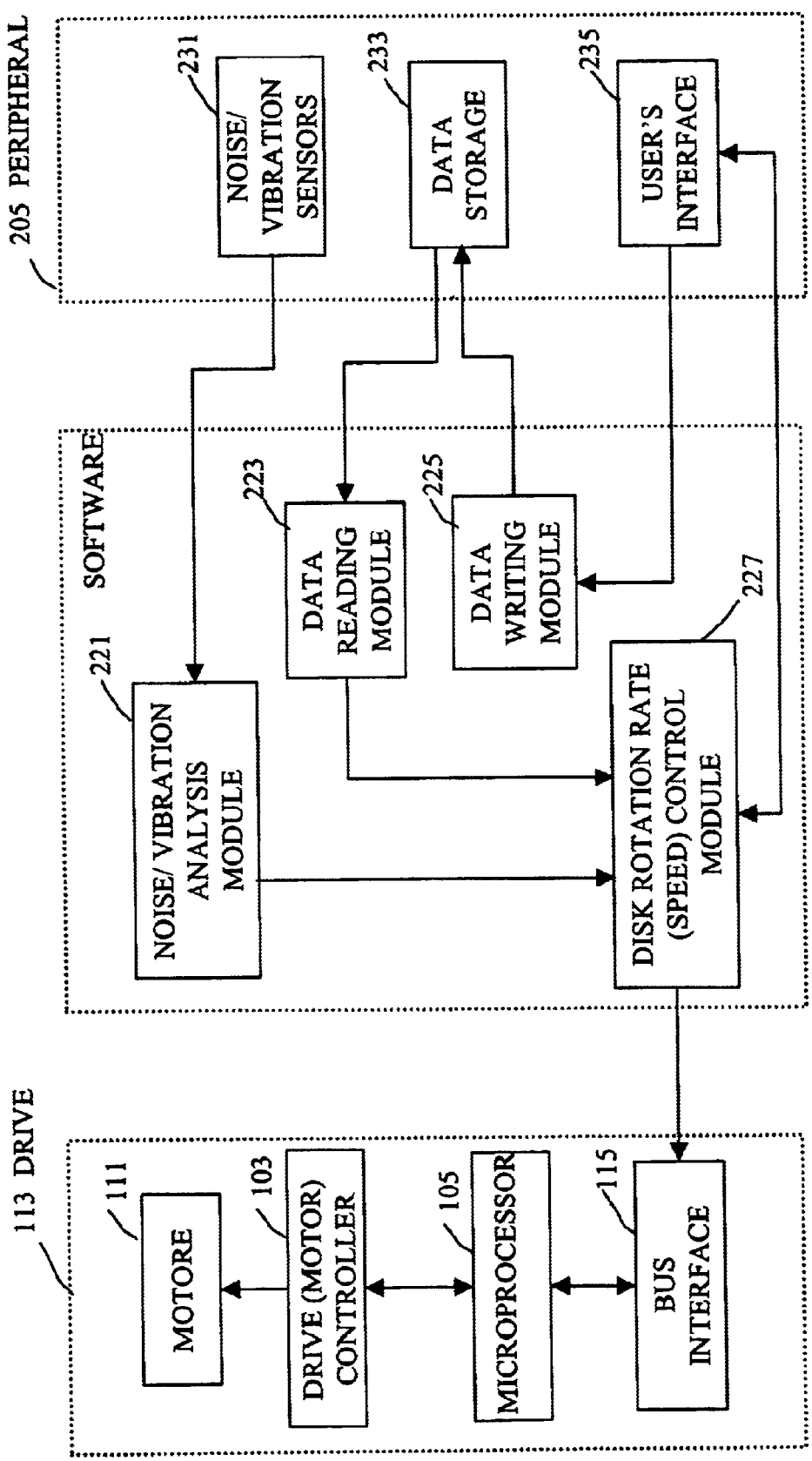
FIG. 2 shows a block diagram of the system including the control method and the apparatus.

A block diagram of the system, showing the control method and the apparatus, is presented in FIG. 2.

There are one or more disk drives in a PC. Disk drive 113 integrates motor 111, motor controller 103 which exercise control over the drive operation, microprocessor 105 and bus interface module 115, which assures interaction of the drive with system bus.

The developed apparatus includes disk rotation rate control module 227, which transmits commands to disk drive 113 via the bus with the use of interface 115. A specified rotation rate value for the drive to be set to is drawn to module 227 either from user's interface 235 (in manual operation mode), or from noise and vibration analysis module 221 (in automatic mode). A choice between the operation modes is performed on the base of information stored in data storage 233, the data being read with the help of data reading module 223. Data reading module 223 also transfers to drive speed control module 227 an initial rate value (the rate value for the disk drive motor to be set to when the system starts). Data writing module 225 is used to save a chosen operation mode and initial rate value, specified by user with the help of user's interface 235, to data storage 233.

Noise and vibration analysis module 221 obtains data from noise and vibration sensors 231 and transforms the signals to disk rotation rate control module 227 in digital form suited for further processing.

Block of noise and vibration sensors 231, data storage block 233, and user's interface block 235 are combined logically into periphery module 205.

Figure 3:
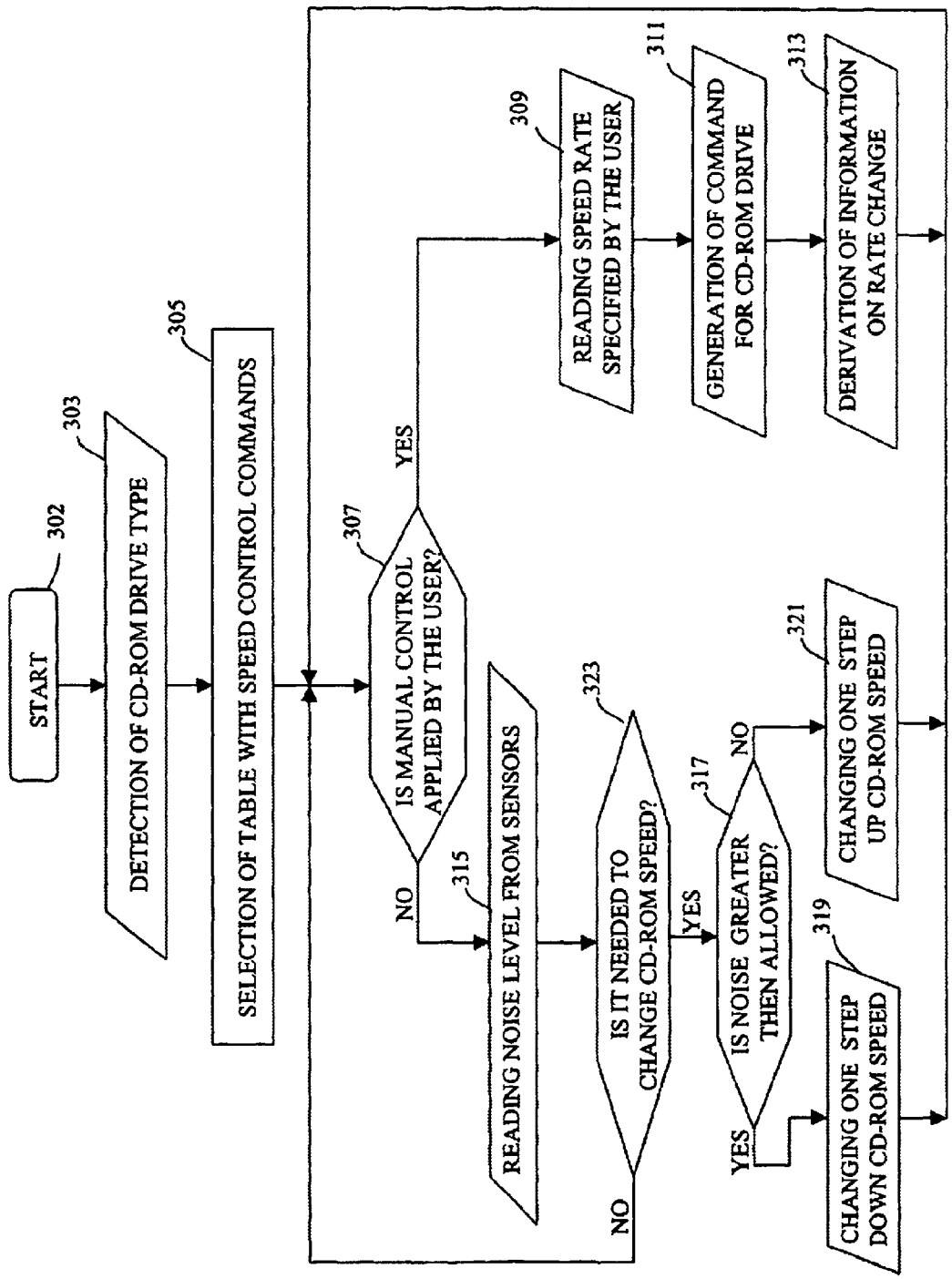
FIG. 3 shows a flowchart of disk drive control both in manual and in automatic operation mode.

A flowchart of disk drive control in manual operation mode is shown in FIG. 3.

After the program is initialized (block 302), the type of CD-ROM drive employed in the PC is determined by block 303, the result being expressed by a related value of parameter type. According to the derived value, corresponding table tab is selected by block 305.

The table tab[j], J=0, 1, . . . , N−1, contains as its element the CD-ROM drive speed control commands, the commands are arranged in order of increasing corresponding speed value, so that tab[0] is the command to set the drive to the minimal, and tab[N−1] is the command to set the drive to its maximal rotation rate. To allow the program to operate with various types of CD-ROM drives which are controlled by different commands, there are a set of corresponding tables storied in data storage 233, the necessary table being read by data reading module 223.

Block 307 finds out weather the user, with the help of user's interface, have activated manual control. In the manual control is activated, the speed rate specified by the user is read by block 309.

Figure 4:
FIGS. 4 and 5 show an example of user's interface dialog window with different manually set CD-ROM drive speed regimes.
Figure 5:
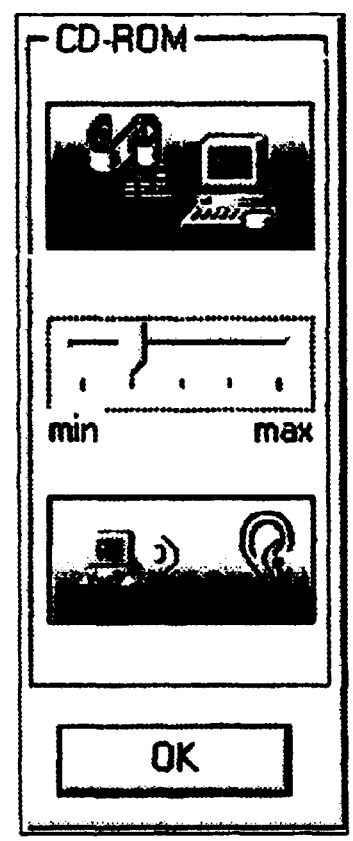

The rate control provided by user's interface might be arranged, e.g., as a standard scroll-bar (see an example of user's interface window in FIGS. 4 and 5). The specified rotation rate may be expressed by its normalized (i.e., divided by the maximal rate) value speed, $0 \leq speed < 1$. It is just the value read by block 309.

To generate the CD-ROM speed control command in block 311, the element tab[round(speed (N−1))] is taken from table tab, function round(x) returns the nearest to x integer.

To afford the feedback, block 313 transmits into user's interface the newly set rotation rate, the latter being presented in the window by its numeric value, or as a pictogram, or otherwise (see FIGS. 4 and 5).

At that step the algorithm returns to the state of waiting for an input from user's interface (the entrance to block 307).

If it is find out (in block 307) that the automatic operation mode is set on, the algorithm works as follows. Block 315 reads the signals from noise and vibration sensors 231. The actual noise/vibration level, $L_{act}$, is compared in block 323 with the level, $L_{sp}$, specified by the user (the value $L_{sp}$ is obtained from data storage 233 via data reading module 223). The decision on necessity of CD-ROM drive speed modification is taken in block 317. If the actual noise/vibration level is higher (lower) than the specified level, the control is transferred to block 319 (correspondingly, to block 321), and current CD-ROM drive-speed control command tab[$j_c$] is changed to tab[$j_c$−1] (provided $J_c$>0), or, correspondingly, to tab[$j_c$+1] (provided $j_c$<N−2); then the control is returned to block 307. To avoid oscillation in the speed control system, the inequality $L_{act}<L_{sp}$ does not involve an increase in CD-ROM drive speed (that is, the change of speed control command from tab[$j_c$] to tab[$j_c$+1]) if the inequality $L_{act}>L_{sp}$ has been hold at the previous step. In other words, the speed fitting process is stopped when $L_{act}<L_{sp}$ provided that the change of current speed-control command tab[$j_c$] to tab[$j_c$+1] would result in opposite inequality $L_{act}>L_{sp}$.

FIGS. 4 and 5 exemplify the user's interface dialog window designed for manual control over CD-ROM drive speed. In the center part of the window there is the user's control mean—a scroll bar provided with a scroll handle that may be set to a desirable position between "min" and "max" (e.g., in FIG. 4 the handle is set to "max").

The upper part of the dialog window contains a pictogram showing a typical CD application corresponding to the handle position (in FIG. 4 it is copying of data from CD to a hard disk at the maximal CD-ROM drive speed; in FIG. 5 it is operation of a multimedia application at a moderate speed). The pictogram in the lower part of the dialog window shows symbolically the noise level corresponding to the chosen CD-ROM drive speed (the level in the case of FIG. 4 is higher than for operation mode corresponding to FIG. 5).

The "OK" button at the bottom of the dialog window is used to close the window.

Figure 6:
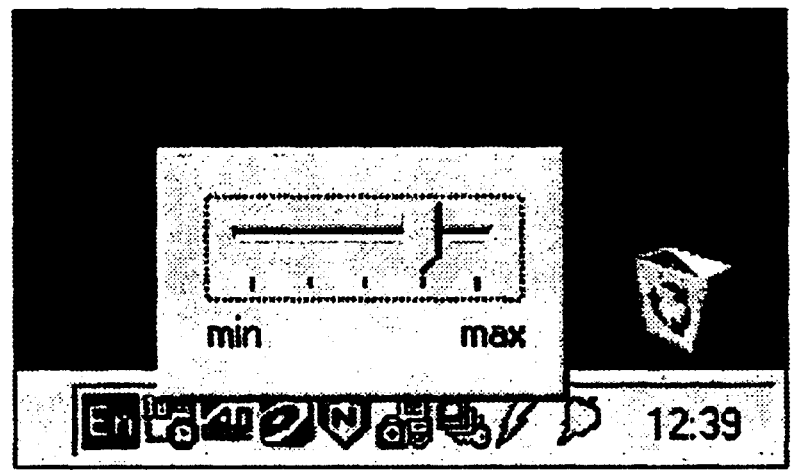
FIG. 6 shows a shortcut icon and a quick-speed-adjust dialog window.

When the user's interface dialog window is minimized, the program is compressed to a system tray. The shortcut icon of the program depicts a green birch leaf (see FIG. 6). When the left mouse button is clicked at the icon, a dialog window of CD-ROM drive speed control appears (FIG. 6). The feature enables a user to modify quickly the drive speed, without opening the user's interface dialog window.

What is claimed is:

1. Apparatus for reducing noise and vibrations in a personal computer having at least one disk data-storage device with data reading from or writing to the disk afforded by rotation of the disk at a steady rate that is prescribed by a command drawn from related processing block of the computer, the noise generated by the drive being a monotone non-decreasing function of the rotational rate of a disk drive motor, said apparatus comprising:

a disk drive provided with the drive motor microcontroller;

a disk drive control program module;

a data file that lists for each logical operation mode an optimum rotational rate for the disk drive motor, the optimal value being the lowest value of rotation rate for the drive to provide a sufficient rate of data exchange between the drive and corresponding data processor, the said disk drive control program module generates necessary control command coming to the drive microcontroller to set the disk drive motor to the required rotation rate in accordance with the optimal disk drive rotation rate value received from the said data file.

2. Apparatus for reducing noise and vibrations in a personal computer having at least one disk data-storage device with data reading from or writing to the disk afforded by rotation of the disk at a steady rate that is prescribed by a command drawn from related processing block of the computer, the noise generated by the drive being a monotone non-decreasing function of the rotational rate of a disk drive motor, said apparatus comprising:

- a disk drive provided with the drive motor microcontroller;
- a disk drive control program module;
- a noise/vibration sensor positioned within the zone adjacent the disk drive and measuring the actual level of noise/vibrations generated by the drive;
- a data file that contains for said disk drive a table that lists for each rotation rate of the drive a command to set the disk drive motor to the rate, and also specifies a desired maximum allowable level of noise/vibrations generated by the drive, said disk drive control program generates necessary control command chosen from the said table to set the disk drive motor to the optimal rotation rate, the optimal rate being the highest rotation rate for which the noise/vibration level as measured by the said noise/vibration sensor does not exceeds the maximum allowable noise level as listed in the said data file.

3. A method for reducing the noise and vibrations in a computer having at least one disk data-storage device with data reading from or writing to the disk afforded by rotation of the disk at a steady rate that is prescribed by a command drawn from related processing block of the computer, the computer being additionally provided with a noise/vibration sensor positioned within the zone adjacent a disk drive and measuring the actual level of noise/vibrations generated by the drive, the method utilizing a data file which contains for said disk drive a table that lists for each rotation rate of the drive a command to set a disk drive motor to the rate, and also specifies a prescribed maximum allowable level of noise/vibrations generated by the drive, said method, after the computer is actuated, comprising the steps of:

[a] reading, from the said data file, the prescribed maximum allowable level of noise/vibrations generated by the drive;

[b] continuously measuring the actual level of noise/vibrations generated by the drive with the use of the said noise/vibration sensor positioned within the zone adjacent the disk drive;

[c] continuously comparing the actual level of noise/vibrations generated by the drive with the prescribed maximum allowable level;

[d] modifying in a stepwise manner the disk drive rotation rate by generating appropriate commands chosen from the said table to set the disk drive motor to the optimal rotation rate, the optimal rate being the highest rotation rate for which the noise/vibration level as measured by the said noise/vibration sensor does not exceeds the prescribed maximum allowable noise level as red from the said data file.

* * * * *